Figure 1:
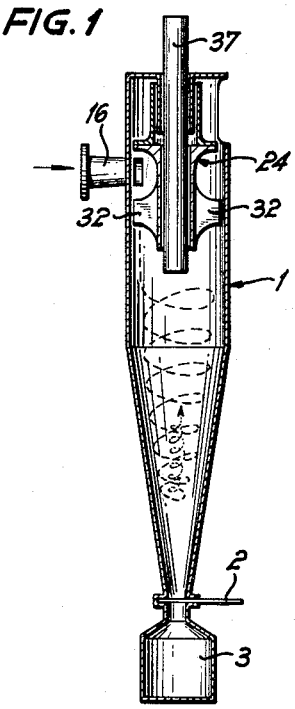

March 9, 1965 A. KURZ 3,172,844
CLEANING APPARATUS
Filed Oct. 19, 1961 2 Sheets-Sheet 1

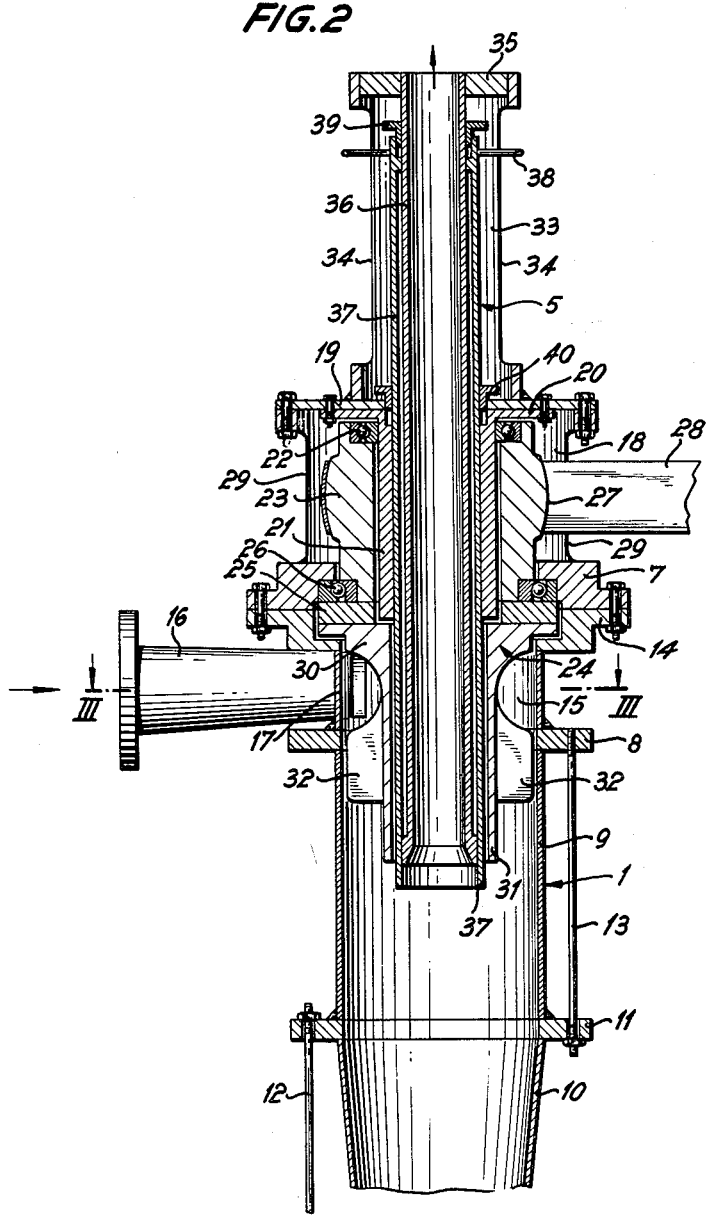

United States Patent Office 3,172,844
Patented Mar. 9, 1965

3,172,844
CLEANING APPARATUS
Anton Kurz, Ravensburg, Wurttemberg, Germany,
assignor to Escher Wyss, G.m.b.H., Ravensburg,
Wurttemberg, Germany
Filed Oct. 19, 1961, Ser. No. 146,244
Claims priority, application Germany, Oct. 21, 1960,
E 20,088
3 Claims. (Cl. 209—211)

This invention relates to a cleaner, namely to a separator for removing heavy dirt for fibrous and/or flaky suspensions, more particularly for paper pulp, wherein the suspension is rotated by rotating vane support in a vertical chamber.

In known separators of this kind the removal system for the fluid to be recovered, that is, the piping through which the suspension is removed from the separator after it has been freed from heavy dirt, takes the form of a central tube which is disposed below the vane support and through which the fluid material descends to leave the separator. However, these constructions have a number of disadvantages. The suspension undergoes a deflection of 180° when it enters the fluid removal system, so that it is very difficult to stabilize the flow. The reason for this deflection is that the cyclical flow first descends, precipitates the heavy dirt at the end of its descent, reverses and rises, and finally, below the vane support, is deflected downwards into the entrance of the fluid removal system. Another disadvantage of known separators of this kind is that the fluid removal system extends out of the side of the chamber, a factor further impairing flow.

According to the present invention, to obviate these disadvantages of the known heavy-dirt separators, the system through which the fluid substance is removed takes the form of a tube which extends centrally and vertically through the vane support. Consequently, the disadvantage of having to place the fluid removal system in the lower part of the separator is obviated, and there is no reversal of the flow at the entrance into such system.

Conveniently, the vane support takes the form of a cylinder which surrounds the fluid removal tube and which has on its periphery axial-flow vanes extending to near the cylindrical chamber wall and which preferably extends a small distance downwards beyond the vanes. This arrangement means that there is provided, near the vane support, an outer zone in which only a downward flow takes place, which continues downwards, while below the vane support is a central zone in which there is substantially only an upward flow.

Advantageously, the fluid removal tube which extends into the chamber can be adjusted in height, since the zone of reversal of the opposite flows may be changed by a variety of factors, such as the consistency of the suspension. If provision for such adjustment is made, the heavy constituent which is to be separated out of the suspension can be kept away from the critical reversal zone by appropriate control of such height.

Advantageously, the suspension is introduced near the vane support either radially or, preferably, tangentially. Conveniently, the vanes are fitted to the vane support below the entry of the suspension supply pipe. Advantageously, the vane support comprises, immediately above the point where the suspension supply pipe enters the chamber, a collar which extends to the chamber periphery and which forms the top boundary of the hydraulically operative part of the chamber. Advantageously, the collar merges continuously on its underside into the periphery of the vane support. An entrance chamber adapted to flow conditions is therefore provided above the vanes. This construction can be further improved if the entrance edges of the vanes, as viewed in an axial plane, have a pattern which is connected continuously to the transition between the collar and the periphery of the vane support.

Conveniently, the vane support is driven by a belt which drives a pulley-like driving member rigidly secured to the vane support and disposed thereabove. Of course, other kinds of drive can be used.

Conveniently, the constructional difficulties associated with the provision of a fluid removal system which can be adjusted in height can be overcome if such system takes the form of double tube system, the inner tube of which has its top end secured to an upward extension of the chamber, while the outer tube is adapted to slide axially between the inner tube and the said top riser.

Figure 3:
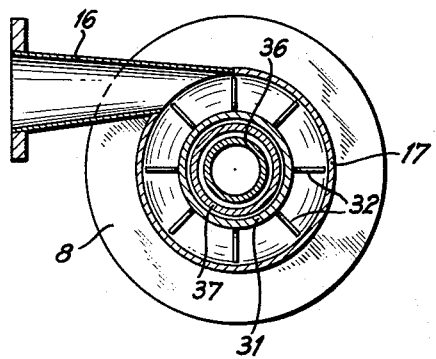

A preferred embodiment of the invention will now be described by way of example with reference to the accompanying drawings, in which:

FIGURE 1 is a general view showing the construction of a heavy-dirt separator according to the invention, the view being in axial section, FIGURE 2 is a view on an enlarged scale, and in axial section, of the upper part of the separator shown in FIGURE 1, and FIGURE 3 is a sectional view taken along the line III—III of FIGURE 2.

Referring to FIGURE 1, the heavy-dirt separator comprises, in a manner known per se, an elongated vertical chamber 1 into which a suspension to be cleaned is introduced through a supply pipe 16. At the bottom of the conical part of the chamber 1 is a gate 2 through which the heavy dirt can be removed periodically into a chamber 3. The pipe 16 is disposed in the upper cylindrical part of the chamber 1, and the suspension which it is desired to clean is introduced through the pipe 16 in a radial plane and either tangentially or radially. An axially displaceable tube 37 through which fluid can be removed extends downwards into the top of the chamber 1. The suspension enters the separator through the pipe 16 and descends through spaces between vanes 32 on a vane support 24, the suspension being rotated by the rotation of the vanes. The flow continues to descend, rotating as it does so as shown by broken lines, and finally reverses at the bottom. As the stream descends, the heavy particles of dirt move into the outermost zones of the flow and are separated out in the reversal zone, thereafter the flow, while still rotating, rises and finally enters the fluid removal duct 37.

The construction of the heavy-dirt separator according to the invention will hereinafter be described in greater detail with reference to FIGURES 2 and 3.

As can be seen in FIGURE 2, the top cylindrical part 9 of the chamber 1 is connected to the bottom conical part 10 thereof by means of a flange 11 and die rods 13, the tops of these rods being screwed into a flange 8 of an annular ring 17 which surrounds the inflow chamber. Tie rods 12 extend to the bottom section of the device. As is more particularly apparent from FIGURE 3, the supply pipe 16 opens tangentially into the ring 17. The flange 7 of chamber top member 18 is secured by screws to a flange 14 connected with the ring 17. Secured by bolts on to the top end of the top member 18 is an annular disc 19 which is welded to a cylindrical upward extension 33. A bearing bushing 21 is bolted by means of its flange 20 to the disc 19. Disposed on the outer periphery of the bushing 21 is a ball bearing 22 which forms an internal support for a pulley-like driving member 23 adapted to drive the vane support 24. The driving member 23 is secured to a flange 30 of the vane support 24 by means of an intermediate ring 25. A second mounting for the driving member 23 takes the form of a ball bearing 26 which is retained externally by the flange 7.

The periphery of the driving member 23 comprises a partly spherical portion 27 adapted to receive a belt 28 for driving the vane support 24. To this end, the chamber top member 18 is formed with at least one aperture 29 through which the belt 28 can extend.

The collar or flange 30 of the vane support 24 merges by a smoothly rounded part into the cylindrical part 31 of the vane support 24, so that the suspension which enters through the pipe 16 is deflected downwards smoothly. Vanes 32 are disposed, below the point of entrance of the pipe 16, on the cylindrical part 31 of the vane support 24, and the vane surfaces extend in substantially axial planes. The leading edges of the vanes 32 are so shaped as to be connected continuously to the transition between the collar 30 and the cylindrical part 31 of the vane support 24. To stabilize the flow, the cylindrical part 31 of the vane support 24 extends for a certain distance below the exit edge of the vanes 32.

The vanes 32 extend substantially the whole distance between the chamber wall and the vane support so that all the flow must pass through the vanes. The vane support 24 can therefore be rotated at a relatively low speed, thus obviating unnecessary eddying yet ensuring that the flow is rotated sufficiently for the heavy particles of dirt to move to the outside of the flow. The gap between the vanes and the chamber wall is as narrow as possible but must be large enough to ensure that particles of heavy dirt cannot become jammed between the outer vane edge and the chamber wall and cause damage.

The system 5 for removal of the fluid extends through the vane support 24, and to enable optimum flow conditions to be achieved, the system 5 can be adjusted in height. To this end, there is disposed above the chamber top member 18 a cylindrical upward extension 33 formed with apertures 34. At its top end, which is formed as a connecting flange 35 for the fluid removal system, the riser 33 supports an inner tube 36 which is stationary and which extends down through the vane support 24 substantially as far as the bottom end thereof. An axially displaceable tube or pipe 37 is mounted between the inner tube 36 and the bushing 31, and handgrips 38 for operating the tube 37 are provided at the top end thereof, extending out through openings 33.

The space between the tubes 36 and 37 is sealed off from the outside by a packing 39, while the space between the tube 37 and the bushing 31 is sealed off by a packing 40. The friction applied by such packings to the tube 37 is sufficient to retain the same in any axial position to which it is set.

Of course, other packings (not shown) are provided to prevent the suspension to be cleaned from reaching the ball bearings 22 and 26.

The invention is not limited to the example illustrated, the latter being merely one very advantageous form of the invention.

What I claim is:
1. In a cyclone separator for fluid suspensions, the combination comprising a vertically elongated housing, an inlet for the suspension at the top of the housing, a central vertical outlet channel for the suspension extending downwardly into said housing from the top thereof, a rotatable bearing member carried by said outlet channel and of less diameter than the housing so as to provide an annular space therebetween, a plurality of circumferentially spaced vanes arranged entirely below said inlet and projecting generally radially from said bearing member substantially completely across said annular space, the gaps between the vanes being open at both ends so that said space forms a channel through which the suspension flows in vertical direction, means for rotating the rotatable bearing member, and means near the bottom of the housing for the removal of separated particles.

2. In a cyclone separator for fluid suspensions, the combination comprising a vertically elongated housing, an inlet for the suspension at the top of the housing, a central vertical outlet channel for the suspension extending downwardly into said housing from the top thereof, a rotatable bearing member carried by said outlet channel and of less diameter than said housing so as to provide an annular space therebetween, a plurality of circumferentially spaced vanes in said housing mounted on said bearing member, said vanes being arranged entirely below said inlet and projecting generally radially from said bearing member substantially completely across said annular space, the gaps between the vanes being open at both ends so that space forms a channel through which the suspension flows in vertical direction, said outlet channel comprising a vertical pipe fixed relatively to the housing and extending into said bearing member and a vertically adjustable pipe surrounding said fixed pipe and extending through said bearing member, means for rotating the rotatable bearing member, and means near the bottom of the housing for the removal of separated particles.

3. In a cyclone separator for fluid suspensions, the combination comprising a vertically elongated housing, a tangential inlet for the suspension at the top of the housing, a central vertical outlet channel for the suspension extending downwardly into said housing from the top thereof, a rotatable bearing member carried by said outlet channel and of less diameter than said housing so as to provide an annular space therebetween, a plurality of circumferentially spaced vanes in said housing mounted on said bearing member, said bearing member comprising a cylindrical body extending downwards below said vanes having a flange extending laterally above the inlet substantially to the inner surface of the housing and surrounding the outlet channel for said vanes, said vanes being arranged entirely below said inlet and projecting generally radially from said bearing member substantially completely across said annular space, the gaps between the vanes being open at both ends so that said space forms a channel through which the suspension flows in vertical direction, means for rotating the rotatable bearing member, and means near the bottom of the housing for the removal of separated particles.

References Cited by the Examiner
UNITED STATES PATENTS

| 2,703,748 | 3/55 | Clark et al. | 210—512 X |
| 2,732,943 | 1/56 | Hagberg | 210—512 X |
| 2,806,599 | 9/57 | Patrick | 209—211 |
| 2,996,187 | 8/61 | Payne | 210—512 X |

REUBEN FRIEDMAN, *Primary Examiner.*

HERBERT L. MARTIN, *Examiner.*